United States Patent
Lofgren-Nisser

Patent Number: 6,062,687
Date of Patent: May 16, 2000

[54] PARTIALLY OCCLUDED CONTACT LENS FOR TREATING VISUAL AND/OR BRAIN DISORDER

[76] Inventor: Gunilla Lofgren-Nisser, Avenue Armand, Huysmans 70, Brussels, Belgium, 1050

[21] Appl. No.: 08/087,813

[22] PCT Filed: Nov. 9, 1992

[86] PCT No.: PCT/BE92/00049
§ 371 Date: Nov. 1, 1993
§ 102(e) Date: Nov. 1, 1993

[87] PCT Pub. No.: WO93/08784
PCT Pub. Date: May 13, 1993

[51] Int. Cl.[7] .................................................. G02C 7/16
[52] U.S. Cl. ........................ 351/46; 351/162; 351/160 R
[58] Field of Search .................... 351/160 R, 160 H, 351/161–177, 41, 45, 57, 203; 359/726

[56] References Cited

U.S. PATENT DOCUMENTS

| | | | |
|---|---|---|---|
| 1,684,725 | 9/1928 | Rowe | 351/47 |
| 2,139,213 | 12/1938 | Verre | 351/165 |
| 3,279,878 | 10/1966 | Long | 351/16 |
| 3,507,566 | 4/1970 | Knapp | 351/165 |
| 3,617,115 | 11/1971 | Pratt | 359/726 |
| 4,576,453 | 3/1986 | Borowsky | 351/162 |
| 4,830,482 | 5/1989 | Resnikoff | 351/172 |
| 5,052,794 | 10/1991 | Brown et al. | 351/162 |
| 5,424,786 | 6/1995 | McCarthy | 351/46 |
| 5,440,359 | 8/1995 | Block-Malem | 351/203 |

*Primary Examiner*—Thong Nguyen
*Attorney, Agent, or Firm*—Darby & Darby

[57] ABSTRACT

An auxiliary apparatus provided for treatment of visual and/or brain disorder comprising an optical element suitable to be worn by a human being and having an occluded part, wherein the optical element comprises at least one contact lens provided with orienting device affording the optical element a substantially stable orientation with respect to an eye wearing the lens, the occluded part being dimensioned in order to occlude at least 50% of the visual input.

22 Claims, 7 Drawing Sheets

PARTIALLY OCCLUDED CONTACT LENS FOR TREATING VISUAL AND/OR BRAIN DISORDER

RELATED APPLICATION

This application is the national phase of PCT application PCT/BE92/00049 filed Nov. 9, 1992, which, in turn, is based on U.S. application Ser. No. 07/790,577 filed Nov. 8, 1991 (now abandoned), but contains additional subject matter. Application Ser. No. 08/236,236, filed May 2, 1994 (now abandoned) is a continuation of application Ser. No. 07/790,577.

FIELD OF THE INVENTION

The invention relates to auxiliary means provided for treatment of visual and/or brain disorder comprising an optical element suitable to be worn by a human being and having an occluded part.

BACKGROUND OF THE INVENTION

Such auxiliary means are known in my aforesaid application and are formed by glasses provided for restricting the initial input of visual information to either the right or left hemisphere of the brain. Those glasses have lenses that are opaque in a vertical portion. By restricting the initial input to one side of the brain, information crossover between the brain hemispheres is limited and processing of information in the brain of an individual who does not have a clear lateralization of function is improved.

Weak cerebral dominance has been proposed as an important factor in reading disability. From existing evidence, it appears that information gained, through reading, is processed by the dominant side of the brain, that is, mostly by the left side of the brain in right-handed people and mostly by the right side of the brain in left-handed people. Many individuals with reading disabilities are left-handed. Estimates are that as many as 70% of left-handed individuals have some degree of reading disability. This has been taken by some investigators as an indication of possible mixed dominance in brain function.

Experiments applied on individuals having visual and/or brain disorder has shown that individuals without a clearly dominant brain hemisphere have what may be termed crosstalk between the two hemispheres which may interfere with the efficient processing of reading material. It is thus important to be able to diagnose and treat reading disabilities that involve the improper directing of visual information to the hemispheres of the brain.

It is well established that retinal processing of visual information is almost entirely laterilized. The left half of the retinal field from the left eye and the left half of the retinal field from the right eye project to the left brain. The right half of the retinal field from the right eye and the right half of the retinal field from the left eye project to the right brain.

A drawback of the use of glasses having an opaque portion is that the glass lenses do not follow the eye movement of the person wearing the glasses, thus allowing some visual input to reach the supposedly blocked portion of the retina. Experiments have further shown that, even if the person would keep his head fixed, some visual and/or brain disorder remained, the latter may have a bad psychological influence on the person.

It is an object of the present invention to provide an improved auxiliary means wherein the drawbacks of the known auxiliary means are mitigated.

An auxiliary means according to the present invention is therefore characterized in that said optical element comprises at least one contact lens provided with orienting means affording said optical element a substantially stable orientation with respect to an eye wearing said lens, said occluded part being dimensioned in order to occlude at least 50% of the visual input. The use of contact lenses provided with orienting means enables the lenses to follow the eye movement of the person wearing the auxiliary means. The orienting means causes the contact lens to rotate on the wearer's eye putting the occluded part in proper orientation. Experiments have shown that visual information is processed in the back of the cortex and then transferred to the temporal lobe. The interpretation of the information is realized by the temporal lobe. Blocking the information transfer from the back of the cortex of the non-dominant hemisphere to the temporal lobe, avoid "crosstalk" between the two hemispheres. The use of a lens enables a more precise occluding of the eye and thus strictly limits the information transfer to the appropriate part of the dominant hemisphere. In such a manner, interfering information will not be produced which would otherwise disturb the interpretation realized in the temporal lobe.

It has to be noted that contact lenses having automatic orientation means are known in the art, for example from U.S. Pat. No. 3,431,327 and U.S. Pat. No. 3,279,878. The 3,431,327 patent discloses a bifocal contact lens that is formed with a small metal weight near one edge. The 3,279,878 patent discloses a lens that is thicker at one peripheral portion. The lens again rotates until the heavy thicker portion is at its lowest position, with the horizontally split field properly aligned. However none of these documents discloses the use of contact lenses with an occluded part and being suitable for the treatment of visual and/or brain disorder.

Tinting of contact lenses, both for cosmetic purposes or for lessening light input to sensitive eyes is also known, although no occlusion takes place, merely lowering of the light intensity. Of course, these lenses do not completely block visual input on any part of the lens and could not be used to selectively block input to vertical hemispheres.

BRIEF DESCRIPTION OF THE INVENTION

Preferably said contact lens of the present invention comprises an occluded and a transparent portion, said occluded portion covering between 70% and 49%, in particular between 55% and 51% of the lens surface. Covering more than 70% is meaningless since it would occlude practically all information input, while covering less than 46% would cause information to go to the unwanted hemisphere.

A first preferred embodiment of an auxiliary means according to the present invention is characterized in that said optical element comprises a set of two contact lenses, the area covered by the occluded portion being substantially equal for each lens of said set. Since it is a brain problem which has to be solved, it is important that information is directed to the correct side of the brain. By covering a substantially equal part of both eyes, it is achieved that no information is directed towards a hemisphere of the brain where it should not go. Further it ensures that both lenses are equal so that the person who has to put them on, does not have to know what is left and what is right.

A second preferred embodiment of an auxiliary means according to the present invention is characterized in that each of said lenses is provided for occluding a portion of the eye divided along a vertical plane. The internal eye structure is built up in such a manner as to have to be divided along a vertical plane into two substantially equal parts. The occluding of a vertical portion of the eye fits adequately with the internal eye structure.

A third preferred embodiment of an auxiliary means according to the present invention is characterized in that said lens is provided for occluding a portion situated around a center of the eye or in a center of the eye. Such types of lenses are particularly suitable to be used in training methods involving a selective occlusion of a portion of the visual field.

The invention also relates to a method for manufacturing such an auxiliary means. The method is characterized in that the location of the occluded part of each lens is determined on the basis of data resulting from an analysis in order to determine the dominant hemisphere of the brain.

BRIEF DESCRIPTION OF THE DRAWINGS

The foregoing and other objects and advantages of this invention will become apparent to those skilled in the art upon reading the detailed description of a preferred embodiment in conjunction with a review of the appended drawings. In the drawings.

DETAILED DESCRIPTION OF THE INVENTION

In the drawings the same reference numerals have been assigned to the same or analogous elements.

Visual and/or brain disorder has been a research subject for several years. One of these disorders is dyslexia which causes the mixing up of letters. So, for example, a "b" respectively a "g" is mixed up with a "d" respectively a "p". Dyslexic people further suffer from uncontrollable disappearance and reappearance of whole lines in a text while reading. Dyslexia is caused by an interference between the non-dominant hemisphere of the brain and the dominant one. By occluding a portion of the visual input, it is possible to block information directed to the non-dominant hemisphere in order to avoid crosstalk.

Dyslexia is a reading disability which is defined as "being unable to translate visual symbols into articular language, and to be unable to process visual information". In reality, it means that the individual is unable to decode written language and give it back orally, and that he cannot make sense of any reading material that the brain received through the eyes. Letters jump in and out of words, whole lines just disappear while a person attempts to read a text. A dyslexic cannot remember what a word looks like and has to decode it each time it reappears. A dyslexic cannot recall the spelling of a word by looking at it and often misspells the simplest words.

This reading difficulty occurs in 5% of the world population. It interferes with school performance and with social and work related activities in otherwise normal individuals.

Before entering into a detailed description on how crosstalk is avoided when use is made of the auxiliary means according to the present invention, these auxiliary means will first be described in detail. In the description, reference will be made to a set of contact lenses. The word "contact lenses" should be understood in a large sense, i.e. not necessarily restricted to an optical member modifying the direction of the incident light, but also to an optical member wherein the outgoing light has the same direction as the incoming. Further, only a single lens instead of a set of two lenses could be used, depending on the disease to be treated or the purpose of the use of such a lens.

Figure 1:
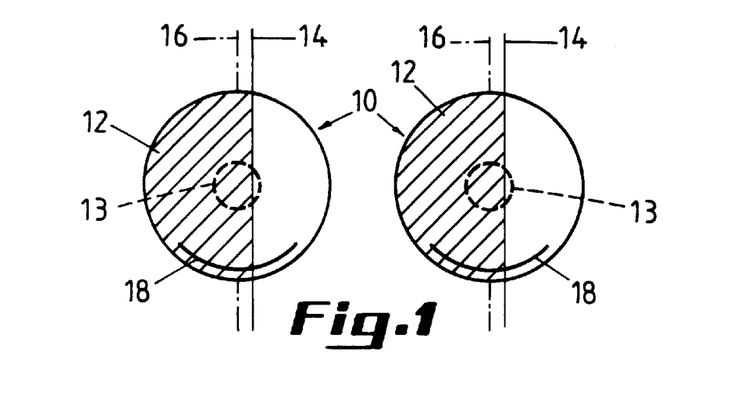
FIG. 1 shows a plan view of a pair of contact lenses according to the invention having occlusion in the left portion of the visual field.
Figure 2:
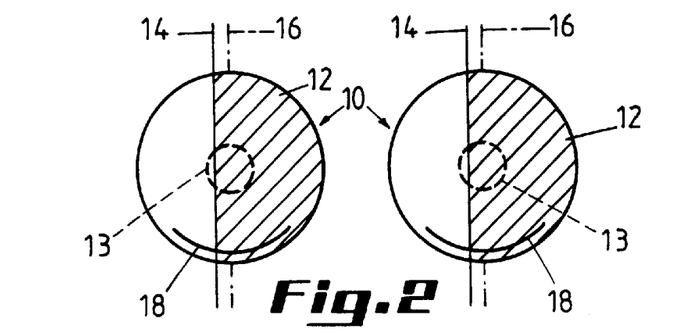
FIG. 2 shows a pair of contact lenses wherein a right portion is occluded.

Referring to the drawings, a preferred field restrictive contact lens 10 according to the invention is illustrated in FIG. 1. The lens material is preferably an acrylamide, although any known contact lens material will work. Generally, a portion 12 of the lens is occluded to restrict visual input to the retina. The portion is preferably defined by an elongated vertical separation line 14 which is offset from the vertical center-line 16 of the lens 10 and which line is to be maintained in a vertical orientation whatever the position of the eye of the user wearing the lens. The occluding method and precise positioning of the vertical separation line 14 is discussed in greater detail below. In FIGS. 1–4, the relative position of the pupil is shown by circle 13.

To maintain the vertical orientation of the occluded portion with respect to the eye, the lens preferably includes an orienting mass 18. It should be noted that such orientation mass is for example utilized in bifocal contact lenses. Any orientation means are suitable if they generally retain the rotational orientation of the lens 10. Preferably, the lens 10 includes a weight 18 embedded within the bottom portion of the lens 10. The weight 18 is preferably an arc-shaped piece of flexible material that does not interfere with either the visual field of the wearer or his comfort. The orienting mass can be any material denser than the lens material, or it can be an additional layer of the same lens material. With this weight 18, the lens 10 will always maintain its rotational positioning with respect to the eye so that an occluded portion of the lens always covers the same area of the eye.

On an occluded portion 12 of the lens 10, there is an impairment of the visual characteristic of the lens 10. This may be accomplished in a number of ways including the use of dyes, the inclusion of material such as titanium in the matrix of the lens body, or the addition of other substances to the surface or the matrix of the lens 10. It is contemplated that dyes restricting certain colours more than others could be employed. The occluding material is only used on the desired portion 12 of the lens, the other portion remains transparent.

Figure 6:
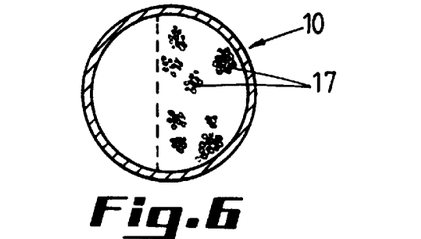
FIG. 6 is a side cross-sectional view of a contact lens according to an alternate embodiment of the invention.

Another method of producing the light restricting portion 12 is to add optical disparities 17 (see FIG. 6) to the matrix or surface of the lens 10 which distort its optical transmission in a manner to prevent focused vision in the occluded area. One example of this method is to cast small diameter (e.g. 0.5 mm) spherical convexities 17 clustered over the desired restricting portion 12. In FIG. 6, the convexities 17 are shown exaggerated in size. While light may pass through the area created by the convexities, the random lens characteristics of the individual convexities produce randomly dispersed rays of light which reach the eye and make it impossible for the brain to distinguish any visual features, thus essentially blocking useful input to the corresponding portion of the retina.

One known method of producing the light restriction on the lens is by a proprietary "custom tinting" process of the Narcissus Foundation in Daly City, Calif. Another method involves composite lenses that are formed of hard lens material in their central portion and soft lens material in an annular skirt around the central portion. With these lenses, the central portion is easily opaqued with know dyes.

In general, the lens 10 should be a comfortably fitting corneal lens. It may also include corrective prescription properties as needed by the individual subject or may be uncorrecting independent of the addition of restricting properties detailed in this application. If a subject requires corrective lenses, but only uncorrecting lenses are available, the subject can wear corrective glasses in addition to the lenses of the invention. Alternatively, any object shown to the subject who is wearing the lens can be adjusted in size and position so that the subject can focus on and distinguish the objects.

The occluding portion of the lens covers between 70% and 46%, in particular between 56% and 54% of the lens surface. Indeed the occlusion must cover slightly more than half of the pupil. This results in the maximum diversion of information to the desired side of the retina and minimal amount of light leakage around the occlusion. Leakage would allow light to impinge on a side that should be blocked, and is, therefore, undesirable. The optimal occlusion for successful screening of visual input to one hemisphere should occlude the pupil of at least 1.5° beyond the center-line 16. The use of computerized (EEG) has confirmed that occlusion of the pupil by a lens with an opaque or semi-opaque area that covers 190° of the pupillary circle produces a significant increase in information to the desired side relative to the blocked side. The occluded portion 12 is considered sufficiently occluded when light provided by a 100 watts light bulb at a distance of 90 cm above and in front of the subject produces a 50% reduction of the brain's response, as compared to a clear lens, when measured by a computerized EEG.

Figure 3:
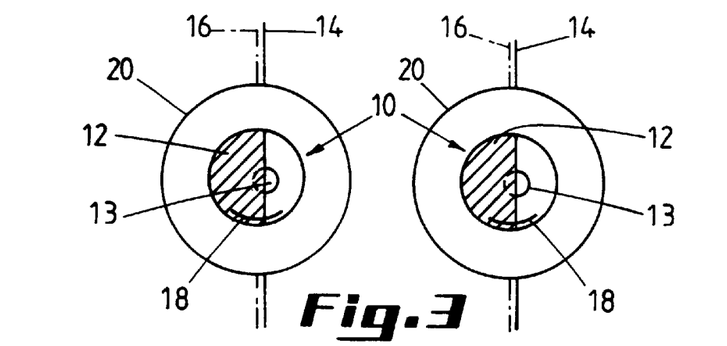
FIG. 3 shows a pair of eyes wearing contact lenses wherein a majority of the pupil and iris are occluded.
Figure 4:
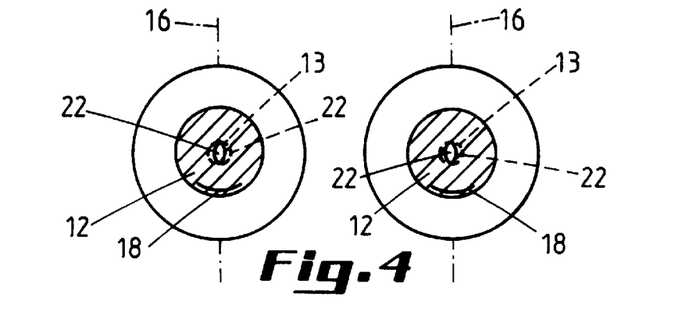
FIG. 4 shows a pair of eyes wearing contact lenses wherein the lateral portions of the pupil are occluded.

FIG. 3 illustrates a set of contact lenses 10 according to the present invention applied on the pupil and iris area of the eyes 20 of a person. As is shown in the FIG. 3, the contact lenses cover a substantial part of the pupil and iris area.

Figure 5:
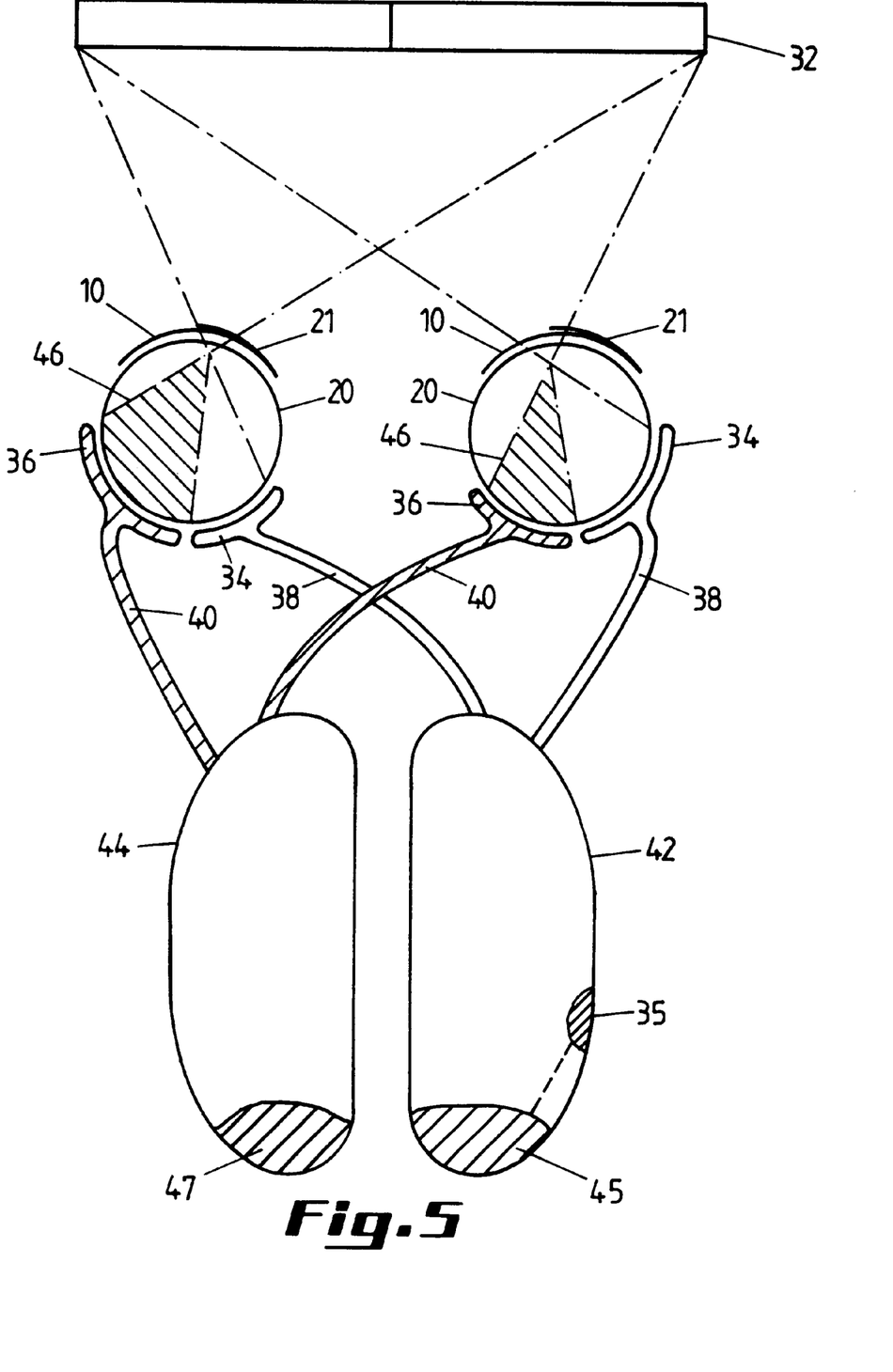
FIG. 5 is a schematic diagram showing operation of the auxiliary means according to the invention.

FIG. 5 illustrates schematically the operation of the field restrictive contact lens according to the present invention. Two eyes 20 are shown with contact lenses 10 having an occluded portion 21 on the surface covering the right portion as divided along the lens vertical line 14. The occluded portion is oriented in a direction to one side of the vertical line 14 since this fits with the brain structure showing a comparable vertical division. The relative scale of this figure is exaggerated so that the occluding material 21 can be seen. In actuality, the material would be a microscopic layer, or absorbed into the lens material. The visual field represented by the bar 32 is shown with its corresponding impact on the retinal fields 34,36 of each eye 20.

The right retinal field 34 and left retinal field 36 of each eye 20 are shown schematically with corresponding optic nerves 38,40 to transmit visual information to the right and left hemispheres 42, 44 of the brain. The shaded portion 46 within each eye 20 shows the portion of the visual field 32 that is prevented from reaching the left retinal field 36 by the occluding material 21 on the contact lenses 10. In this case, the right portion of the visual field 32 is "unseen" by the left retinal fields 36. The left retinal fields 36 and nerves 40 are also shaded to illustrate that restricted or reduced visual information is being transmitted to the left hemisphere 44 of the brain. The restriction of information depends on the coverage of the occluding material and may not always be total restriction since it is known that the fovea of the retina can still transmit some signals to both hemispheres when other retinal portions are occluded. The right retinal fields 34 have an unimpaired view of the left portion of the visual field 32 and send appropriate nerve impulses to the right hemisphere 42 of the brain. It should be noted that a pair of contact lenses 10 having occluding material 21 on the opposite portions could be similarly used, substantially only allowing visual information to be transmitted to the left hemisphere 44 of the brain.

Some of the visual information processing disorders include, but are not limited to disabilities involving the retina, optic nerve, optic chiasm, optic tract, primary visual cortex or visual association cortex. Reading disabilities like dyslexia include, but are not limited to, those involving visual pattern discrimination and visual object recognition.

A common problem seen in people with dyslexia is weak brain dominance ; that is normal individuals have a dominant hemisphere that governs functions like speech and reading. By right-handed individuals, it is the left hemisphere of the brain; by left-handed, it is the right hemisphere. Usually, the dominant side can be determined from handedness, for example by testing with which hand or foot a person throws or kicks a ball. Dyslexics, however, are often ambidextrous or at least do not strongly favour one hand. Through the use of computerized EEG methods, the dominant hemisphere of the brain can be determined even in ambidextrous individuals. It is the purpose of the lens according to the invention to enhance information flow to the dominant side of the brain which is the side involved in processing reading. This is done by blocking information to the non-dominant side through the use of partly occluded lenses.

As illustrated in FIG. 5, the retina of the eye is organized so that information impinging on its lateral side goes to the cortex 45 on the same side, whereas information impinging on medial side crosses over to the cortex 47 on the opposite side.

Experiments have shown that visual information is processed in the back of the cortex 45 and then transferred to the temporal lobe 35 wherein the interpretation of the information is realized. Those experiments make use of standard EEG tests to monitor the visual evoked potential (VEP) in the hemispheres of the brain, in particular in the cortex. The currently preferred system for collection and presentation of VEP is the NeuroScience Brain Imager High Performance System, which is a 32 channel EEG and evoked potential system.

Figure 7A:
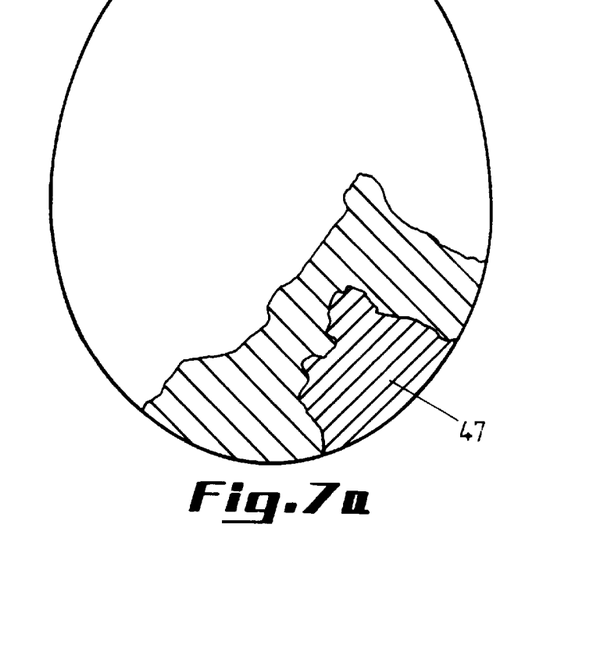
FIGS. 7a and 7b respectively show a left and a right hemisphere of the brain of a person which does not have visual and/or brain disorder problems.
Figure 7B:
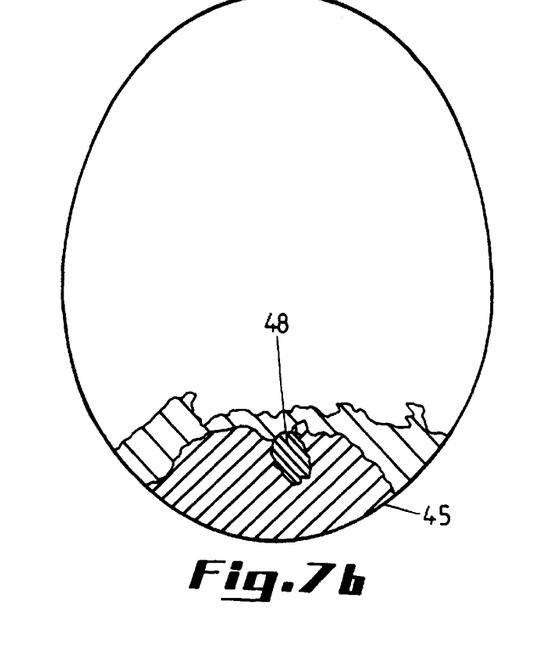

FIGS. 7a and 7b respectively show the left and the right, brain hemisphere of a person A with no visual and/or brain disorder. The person A did not wear a set of contact lenses according to the present invention. The person A had to read a text during the test. The person A was able to read 168 words a minute without errors.

As is shown in these figures, there is brain activity in both hemispheres. However, there is a heavier activity in the cortex of the left hemisphere. The latter being illustrated by the shaded area 48 in the cortex 45 of the left hemisphere. The person thus clearly has a right brain dominance.

Figure 8A:
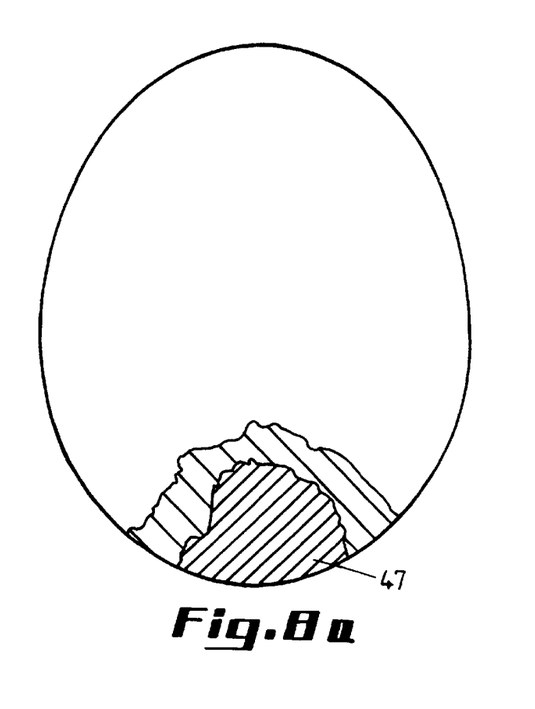
FIGS. 8a and 8b respectively show a left and a right hemisphere of the brain of a person having dyslexia.
Figure 8B:
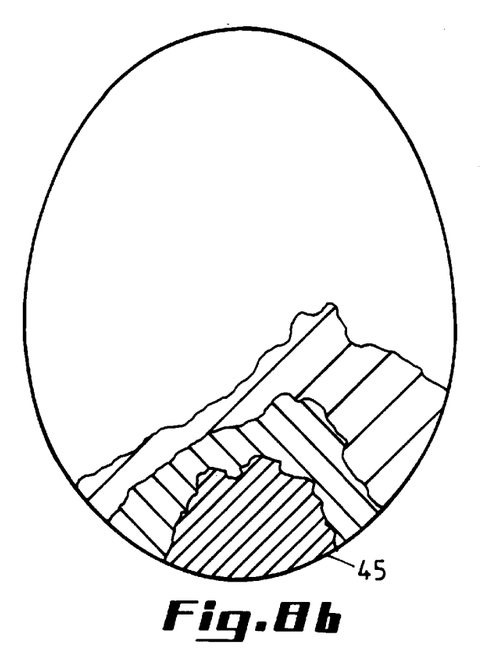

The FIGS. 8a and 8b show the left the right, brain hemisphere of a person B having visual and/or brain disorder. The person also did not wear a set of contact lenses according to the present invention. The person B was asked to read the same text. He was able to read 112 words a minute without errors, which is substantially less than the 168 words of person A. FIGS. 8a and b clearly show a comparable activity in the left and right hemispheres so that no clear dominance is present.

Figure 9A:
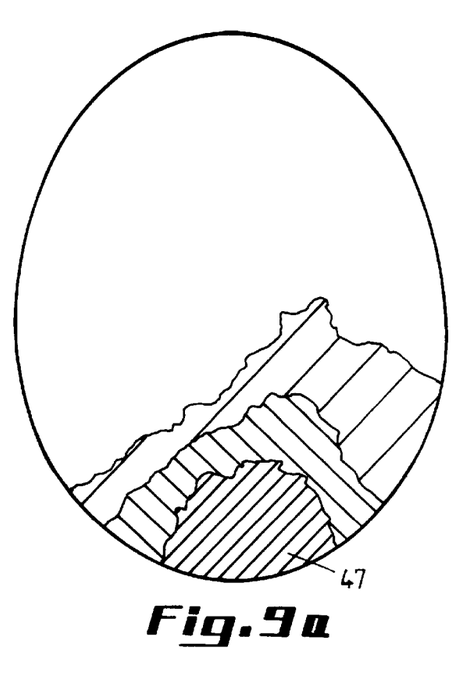
FIGS. 9a and 9b respectively show a left and a right hemisphere of the brain of a person wearing an auxiliary means according to the invention of which the right part is occluded.
Figure 9B:
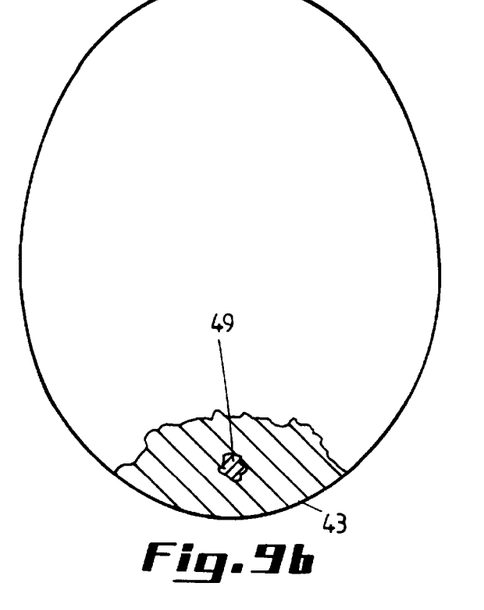

FIGS. 9a and 9b show that left and the right, brain hemisphere of the same person B wearing a set of lenses wherein the occluded portion 21 is on the right side of the lens 10. As is shown in FIG. 5, this signifies that information input to left hemisphere is blocked. The person B again has to read a comparable text. The test showed that person B was able to read 89 words a minute without error. Compared to the 112 words without glasses, this clearly proves that it was not the correct portion of the lens which was occluded. FIG. 9a shows that in the left brain hemisphere there is no clear concentration of activity. There is some activity but it is only weak and randomly distributed over the brain hemisphere. In the right hemisphere (FIG. 9b) where information is input, there is some activity in the cortex illustrated by the shaded area 49, but the activity is too weak to enable an adequate processing.

Figure 10A:
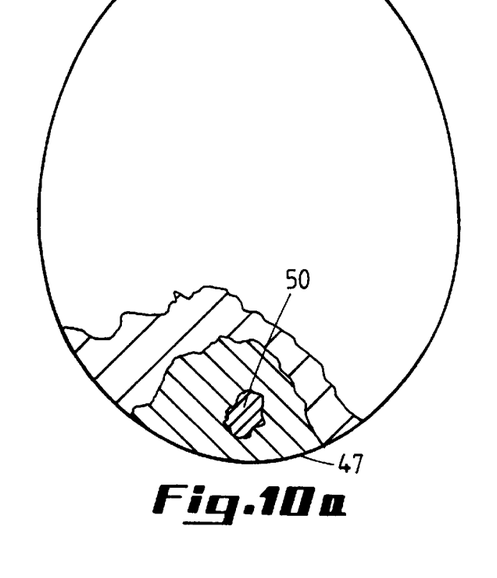
FIGS. 10a and 10b respectively show a left and a right hemisphere of the brain of a person wearing an auxiliary means according to the invention in which the left part is occluded.
Figure 10B:
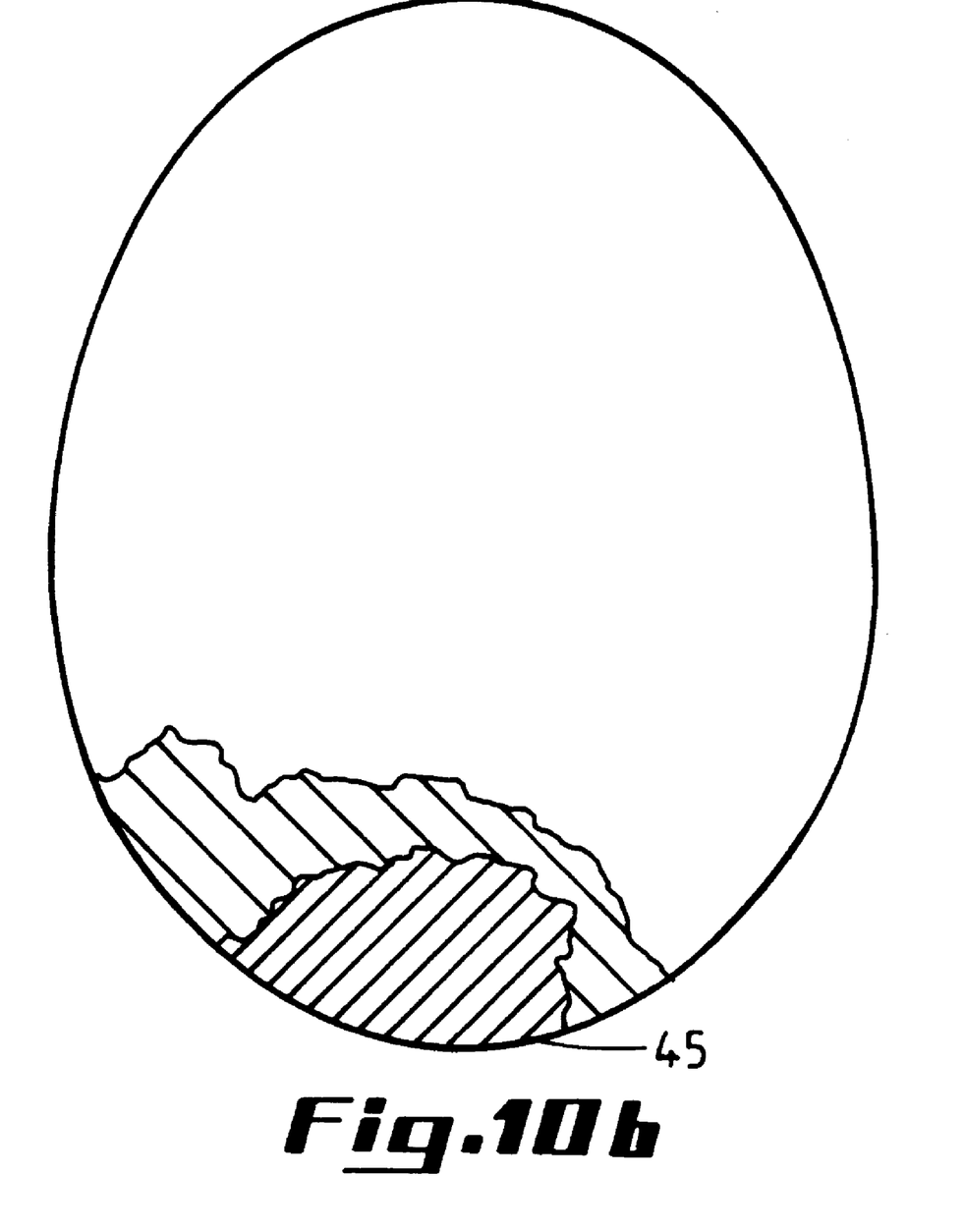

FIGS. 10a and 10b respectively show the left and the right, brain hemisphere of the same person B wearing a set of contact lenses wherein the occluded portion 21 is on the left side of the lens. Now, the input to the right hemisphere is blocked. The person B was now able to read a similar type of text and to reach 129 words a minute without errors. With respect to the 112 words reached without the contact lenses, this is a clear improvement. FIG. 10a shows a clear concentrated activity, illustrated by 50, in the cortex of the left hemisphere, while only some rather weak activity occurs in the right hemisphere. The test thus clearly shows that the lenses with the occluded left portion are the correct one to be used by the person B in order to improve his reading ability.

FIGS. 8–10 clearly illustrate the problem of a dyslexic person having no clear brain dominance. Since there is activity in both hemispheres, as illustrated by FIG. 8 (a+b) crosstalk will occur between the cortex of both hemispheres. The information of the one cortex will thus interfere with the one or other cortex. This interfering information will perturb the information transfer towards the temporal lobe (FIG. 5) and the interpretation therein. By occluding a portion of the visual input, the brain activity in the undesired non-dominant hemisphere is substantially reduced as is illustrated by comparing FIG. 8b with FIG. 10b, thus leading to practically eliminating crosstalk.

In order to avoid crosstalk, it is thus important to reduce as much as possible the brain activity in the undesired hemisphere of the brain. It is the insight into this phenomena that has led to the use of contact lenses as an auxiliary means according to the present invention for treatment of visual and/or brain disorder. Due to the fact that the contact lenses according to the present invention are placed in direct contact with the eyes and that they are kept in the correct position by the orientation means, an adequate occluding of the visual input is obtained regardless of the eye movement of the person wearing them. This adequate occluding now enables to correctly direct the information to the desired hemisphere. The latter cannot be obtained with glasses since, due to the distance between the glass and the eye, the movement of the eye will always lead to an information input in the undesired hemisphere, which will then automatically lead to crosstalk.

To determine the proper degree of occlusion of the pupil in a given subject by using computerized EEG, one will generally start with occlusion of one side of 49%. Increasing degrees of obstruction can be tested, up to 55%. At some point between 49% and 55% a maximum shift of information will occur away from the undesired side. This will be reflected by a loss of EEG activation in the undesired side and increasing asymmetry, favouring the desired side. Once optimum occlusion occurs, no further asymmetry will develop. For example, if maximum loss of activity in the undesired side occurs at 51% occlusion of the pupil, increasing the occlusion further would begin to block information flow to the desired side.

The EEG test is of course the most suitable manner to determine which part of the contact lens should be occluded. Nevertheless, other alternatives are also applicable. One could use the already described ball test in order to determine whether the person is left or right dominant. A microscope or telescope test could then be used to determine the dominant eye. Of course a trial and error method could also be used.

It is contemplated that one eye could be tested independently. In this case, the untested eye would be fully occluded. Full occlusion can be accomplished easily, for example, by closing the untested eye, covering it with an eye patch, or with a contact lens similar to the present invention, except the occluded portion covers approximately the entire lens.

The present invention can also be used for training obstruction of a portion of the visual field. For non-limiting example, there could be applications, such as for example the training of pilots, where it is desirable to train a subject to be more attentive to a certain portion of his field of view, such as a portion of a cockpit instrument panel. Lenses such as those shown in FIG. 4 would allow the subject to see objects in the centre of his field of view, essentially blocking his peripherial vision. This is accomplished by creating two occluded portions 22 and the lateral edges of the visual field. This could enhance focused vision or help eliminate distractions in the periphery. Conversely, if only the centre of the pupil 13 were blocked, the subject could receive training in enhancing awareness of the peripheral vision. For those lenses the occluded portion may go up to 70% of the lens' surface.

Thus, it can be seen that the contact lens of the present invention can effectively block or restrict visual input to a selected area of the retina and thus the brain. The lens can also be used for diagnosis and treatment of various disorders by accurately, completely and selectively blocking visual input to a portion of the retina and the brain, regardless of eye movement or movement of the object.

I claim:

1. A field restrictive contact lens for an eye of a wearer for treatment of visual and/or brain disorders, comprising:

a contact lens body to be worn in the eve of a user having a pupillary area for covering a pupil of the wearer's eye, said lens body pupillary area being divided along an elongated line into a first portion and a second portion, one of said portions to one side of said line being transparent and the other portion to the other side of said line being formed to occlude the normal transmission of light and visual input substantially to only a selected left or right retinal field of the eye of the wearer; and an orienting means as part of said lens body for maintaining the orientation of said elongated line of said lens body substantially vertical when said lens body is in an eye so that said occluded lens body portion covers only a selected portion of the eye pupil corresponding to a selected one retinal field of the wearer to which normal visual input is to be occluded.

2. A method for manufacturing a field restrictive contact lens as claimed in claim 1, wherein the location of the occluded part of the lens is determined by an analysis that determines the dominant hemisphere of the brain.

3. A field restrictive contact lens according to claim 1 wherein said elongated dividing line is straight.

4. The field restrictive contact lens according to claim 1 wherein said occluded portion is between a maximum of 70% and a minimum of 46% of said lens body pupillary area.

5. The field restrictive contact lens according to claim 1 wherein said occluded portion of said lens body is between a maximum of 56% to a minimum of 54% of said pupillary area.

6. A field restrictive contact lens according to claim 1 wherein said portion of said lens body formed to occlude comprises a light occluding material integral therewith to decrease the transmission of light therethrough to the selected retinal field.

7. A field restrictive contact lens according to claim 1, wherein said portion of said lens body formed to occlude is covered with a light occluding material to prevent transmission of light impinging thereon to the selected retinal field.

8. A field restrictive contact lens according to claim 1 wherein said portion of said lens body formed to occlude comprises a plurality of elements on the surface of said portion for dispersing light incident thereon to prevent transmission to the selected retinal field.

9. A field restrictive contact lens as in claim 1 wherein said lens occluding portion has a uniform light blocking characteristic throughout.

10. A method for manufacturing a field restrictive contact lens as claimed in claim 9, wherein the location of the occluded part of the lens is determined by an analysis that determines the dominant hemisphere of the brain.

11. A field restrictive contact lens as in claim wherein said occluding portion transmits substantially no light.

12. An auxiliary means for treatment of visual or brain disorders related to left and right brain hemispheres of a human subject whose eyes have left and right retinal fields respectively related to the left and right brain hemispheres, comprising:

a contact lens to be worn in the eye of the human subject, said lens having a portion for transmitting visual input to one of the eye retinal fields and a portion for occluding visual input to the other retinal field;

means on said lens to stabilize its orientation in the subject's eye such that the portion for occluding restricts visual input to substantially only a selected one of the left and right retinal fields and the corresponding left and right brain hemispheres, and the portion for transmitting transmits visual input to the other of the retinal fields and its corresponding brain hemispheres at all positions of the eye in which the lens is located.

13. An auxiliary means as claimed in claim 12 wherein said contact lens occluding portion covers between 70% and 49% of the lens surface.

14. An auxiliary means as claim in claim 13, wherein the occluding portion covers between 55% and 51% of the lens surface.

15. An auxiliary means as claimed in claim 12, comprising a second contact lens of a structure corresponding to the first named contact lens for the other eye of the subject, said stabilizing means of said second contact lens orienting the occluding portion of said second lens to occlude visual input to the same retinal field of the other eye and the corresponding brain hemisphere as the first named contact lens and the portion of said second contact lens for transmitting transmits visual input to the same retinal field of the other eye and the corresponding brain hemisphere as the first named contact lens.

16. An auxiliary means as in claim 15 wherein the area of the occluding portion of each said first named and second contact lens is substantially the same.

17. An auxiliary means as in claim 15 wherein the visual input transmitting and occluding portions of each said first named and second lenses are separated by an elongated line which is maintained in a substantially vertical orientation in the respective eye of the subject by said stabilizing means.

18. An auxiliary means as in claim 12 wherein said occluding portion covers at least about 50% of the lens surface.

19. An auxiliary means as in claim 18 wherein said lens visual input transmitting and occluding portions are separated by an elongated line which is maintained in a substantially vertical orientation in the eye of the subject by said stabilizing means.

20. An auxiliary means as in claim 19 wherein said lens occluding portion has a uniform light blocking characteristics throughout.

21. An auxiliary means as in claim 20 wherein said occluding portion transmits substantially no light.

22. A lateral vision controlling device for use by a person with a dominant hemisphere of the brain, comprising:

a) a pair of lenses adapted to be worn over the person's eyes as vision related eye wear;

b) each said lens having a transparent portion and a masked portion;

c) said masked portion on each said lens being adapted to reduce visual stimuli entering one side of the person's eyes; and d) said masked portion is on a side of each said lens corresponding to a hemisphere of the brain on which the visual stimuli is reduced.

* * * * *